Figure 1:
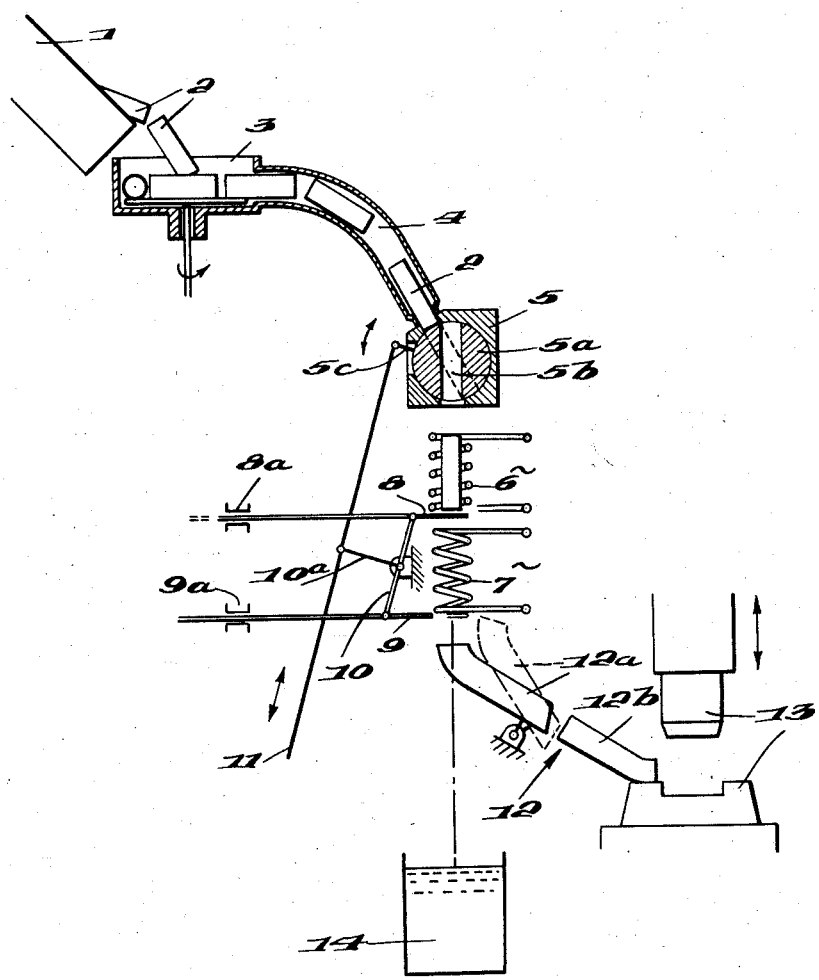

Sept. 22, 1959     E. GUYER ET AL     2,905,797
METHOD AND APPARATUS FOR HEATING
NON-FERROUS METAL WORK PIECES
Filed July 1, 1957     2 Sheets-Sheet 1

INVENTORS
Ernst Guyer
Oskar Pfaff
BY Pierce, Scheffler & Parker
ATTORNEYS

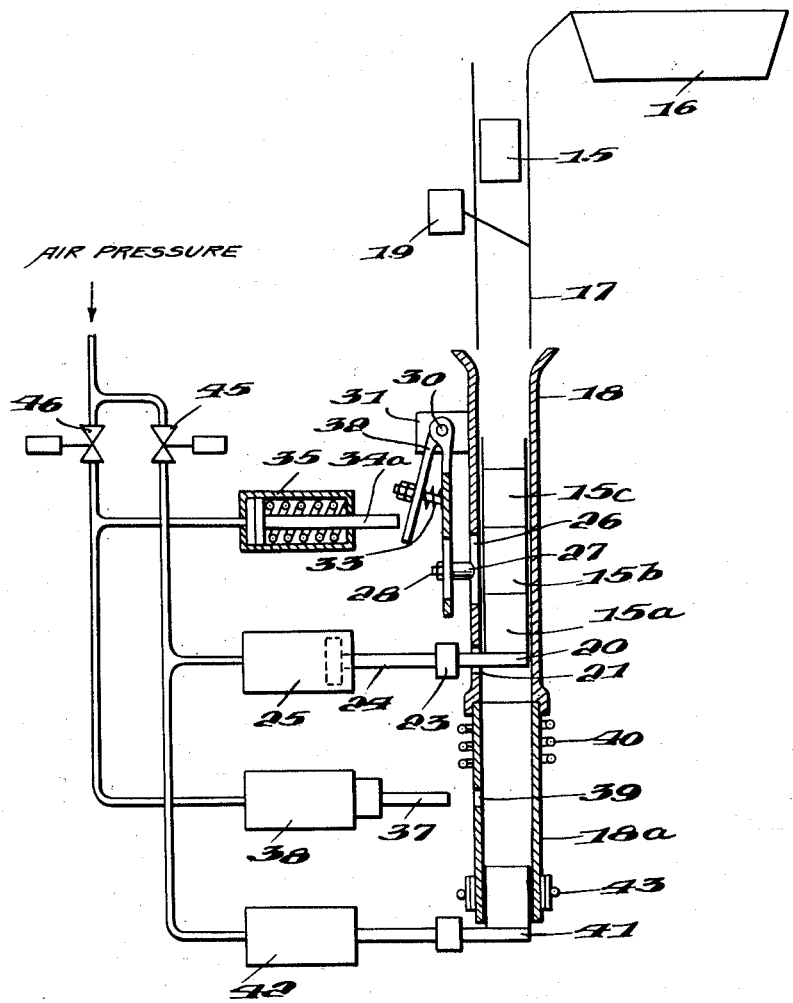

United States Patent Office 2,905,797
Patented Sept. 22, 1959

2,905,797

METHOD AND APPARATUS FOR HEATING NON-FERROUS METAL WORK PIECES

Ernst Guyer, Ennetbaden, and Oskar Pfaff, Neuenhof, Switzerland, assignors to "Patehold" Patentverwertungs- & Elektro-Holding A.-G., Glarus, Switzerland, a joint-stock company Application July 1, 1957, Serial No. 669,304

Claims priority, application Switzerland October 8, 1956

6 Claims. (Cl. 219—7.5)

This invention relates generally to a method and apparatus for heating work pieces of non-ferrous metal for hot-pressing by means of inductive high-frequency heating, and more particularly to an apparatus for heating the work piece in a first heating stage to a high pressing temperature and for maintaining the work piece in a second heating stage at a somewhat lower temperature to effect temperature equalization of the piece.

In the known methods of heating work pieces prior to hot-pressing, where relatively large quantities of blanks of non-ferrous metal are heated in resistance furnaces, the heating time comprises a period of about 15 minutes. This long heating period does not allow proper heating of the blanks from a metallurgical point of view, since during such a period of time and at the required heating temperature, the zinc present in most of the alloys oxidizes at the surface with a "burning" effect. This results in an impoverishment of zinc in the surface layer so that an undesirable diffusion of zinc from the inner to the outer layers of the piece is effected. Ultimately there is thus produced a reduction of the zinc content over the entire cross-section of the work piece and a thick oxide skin is formed at the work piece surface.

The effect of too long a heating time at elevated temperature produces also a growth of crystals which is disadvantageous for the quality of the final product. These modifications in metallurgical structure are easily observable after the work pieces have been polished.

These phenomena appear especially when small parts of non-ferrous metal are heated for the purpose of hot-pressing. The instant invention is particularly concerned with work pieces having a mass of 100 g. and less, such as are used mainly in the watch industry.

The instant invention was developed to overcome the disadvantages presented by the known heating methods.

The primary object of the instant invention is to provide a method and apparatus for heating, prior to hot-pressing, work pieces of non-ferrous metal by means of inductive high-frequency heating within a period of less than 20 seconds to the desired temperature of the best shapeability.

The method according to the instant invention makes it possible to supply the work parts piece by piece at regular intervals of time to the heating process and to remove them after heating for conveyance directly to the pressing device. The parts pass for example from a storage container into the first-stage zone of the inductor. After a brief stay in the first-stage zone of the inductor, the pieces are transported to a second heating stage and then to the pressing tool. Owing to these uniform intervals of time for the conveyance of the parts it is possible also to control the press operation in a simple correctly-timed manner.

Because of the short heating time according to the invention it is possible to introduce the raw material in strip or wire form into the inductor, where the quantity required for one stamping operation is heated. Heating of a certain minimum supply, as in the methods of the prior art, is not necessary, and the danger of pre-oxidation is thereby avoided.

According to the instant invention, during work stoppage there is never more than one piece subjected to high temperature at a time, in contrast to the former methods where the furnace always contained a definite work piece supply, which supply was not suitable for further treatment because the parts were exposed to elevated temperature for too long a period of time.

As stated above it is desirable to do the heating of the work pieces in two stages according to the instant invention. In the first stage the part is brought, with the optimum specific value adapted to the dimensions of the part, to the upper permissible limit of the pressing temperature over as large a cross-section as possible. In a second stage the temperature is equalized over the entire cross-section by reheating with reduced high frequency output.

These two processes occur in a period of less than 20 seconds. In this short period of time there is caused no harmful effect on the structure of the work pieces.

The invention relates also to a device for practicing the method of heating described above. This device consists in a supply channel directed to a charger superposed above two high-frequency coils in successive arrangement at the ends of which are positioned horizontal holding pins arranged for alternate insertion into the path of the work parts falling from the charger, the movement of the holding pins and the movement of the charger being interconnected, and immediate after the opening movement of the lower holding pins the work piece is fed through a guide channel into the pressing tool for immediate further treatment.

Other objects and advantages of our invention will become more apparent from a study of the following specification when considered in conjunction with the accompanying drawings in which:

Fig. 1 is a partially sectioned schematic view of a first embodiment of our invention; and Fig. 2 is a partially sectioned elevational view of the preferred embodiment of our invention.

Referring now to Fig. 1, from a storage container 1 the non-ferrous work pieces 2, which may be in the form of cylinders, rectangular blocks, or the like, pass onto the rotary table of the supply apparatus 3 and are fed by means of the supply channel 4 to the charger 5. Pivotally mounted within the charger 5 about its horizontal longitudinal axis is a cylindrical member 5a having a transverse bore 5b extending therethrough. Lever 5c connected to the cylindrical member 5a provides means for pivotally moving the same within the charger housing. When the cylindrical member 5a is pivoted in the counterclockwise direction as shown in phantom lines in Fig. 1, a work piece is introduced into the transverse bore 5b. When the cylindrical member 5a is pivoted in the clockwise direction to the position shown in the figure, the work piece falls by gravity into the high frequency heating coil 6 and is supported therein by the longitudinally reciprocating supporting pin 8. Upon retraction of the pin 8 to the left in the figure, the work piece may then fall by gravity into the second high frequency coil 7 wherein it is supported by a second longitudinally reciprocating supporting pin 9. The supporting pins 8 and 9 are slidably mounted within fixed guides 8a, 9a respectively and are so connected by link 10 pivotally connected intermediate its ends to a fixed pivot that as one pin is retracted, the other pin will be positioned beneath its associated heating coil. Control rod 11 actuated by suitable timing means, not shown, is connected to lever 5c at its upper end and controls the movement of lever 10 about its fixed pivot by means of lever 10a pivotally connected thereto.

Positioned beneath the lower heating coil 7 is a supply chute 12 for conducting the heat treated work pieces to the pressing tool 13. The supply chute consists of a pivotally movable first section 12a and a stationary second section 12b. The first section 12a is so connected to the pressing tool that if the tool 13 has not completed the pressing operation, the section 12a will be in its retracted position as shown in phantom lines in the figure, and the work piece emitted from the second heating coil 7 will fall into the water-filled vessel 14. If desired, the operation of the press may be connected to the operation of pins 8 and 9 by suitable linkage means connected to rod 11.

The inductor heating coils 6 and 7 are connected to a source of high frequency electrical power so that coil 6 induces in the work piece a relatively large amount of heat while the coil 7 induces a relatively smaller amount of heat. The upper frequency coil heats the work piece quickly to a temperature which is optimum for shapeability, and the lower coil holds the work part at the attained temperature for the desired length of time. During this time the temperature is distributed evenly over the entire work part, and the latter is thus prepared for the subsequent shaping in one operation.

The work cycle for heat treating a workpiece is as follows: From the storage container the parts are poured into the supply apparatus 3. The pieces are then fed successively through the supply channel 4 at constant intervals of time into the bore 5b of the cylindrical member 5 which oscillates to and fro. As soon as the cylindrical member turns from the position indicated by the phantom lines into the vertical position, the work piece falls into the interior of coil 6, and is retained therein by the guide pin 8, while at the same time the work piece contained in coil 7 falls into the guide channel 12a and 12b due to the retraction of pin 9. From the guide channel the work piece slides into the pressing tool 13 and is immediately thereafter pressed into its desired form.

The entire feed process from the charger to the tool takes at most 20 seconds. The first 5 to 15 seconds serve to bring the work part in coil 6 to the temperature which is optimum for the subsequent hot shaping. The remaining time serves to equalize the temperature over the entire work part. The total time of at most 20 seconds is now sufficiently short to prevent a harmful structure influence from taking place in the metal.

The method and the device are preferably employed for the manufacture of products in the watch industry. For example, watch cases, watch bottoms, dials, blanks, etc. can be made particularly economically and in a quality not previously attained. Instead of the former numerous individual stamping operations, with the annealing operations following these, it is now possible to carry out these processes in a single operation. This results in a high economic efficiency, and also, as a result of the better material structure, a satisfactory surface is obtained. This satisfactory surface is necessary for a neat polishing and a satisfactory galvanic surface treatment.

In order further to reduce oxide formation on the surface it is desirable to lodge the coils of the heating stages in a housing which contains a protective gas atmosphere. In the simplest case illuminating gas is sufficient.

Referring now to the preferred embodiment of the invention illustrated in Fig. 2, the work pieces 15, which may be in the form of cylinders, rectangular blocks, or the like, are fed from the supply magazine 16 through guide channel 17 to the vertical guide chamber 18. Control means 19 prevents an overfilling of the guide channel with work pieces. The first work piece 15a is supported by a charger holding pin 20 which extends through aperture 21 in the wall of the guide chamber 18. Holding pin 20 is connected through suitable clamping means 23 to piston 24 slidably movable in the horizontal plane within air pressure cylinder 25. Extending through vertically elongated aperture 26 in the wall of the guide chamber 18 is a charger pressure thumb 27 adapted to contact the second work piece 15b to urge the same against the opposed inner wall of the annealing chamber. The pressure thumb 27 is connected by vertically adjustable means 28 to lever 29 pivotally connected by pivot 30 to bracket 31 on the guide chamber wall. Also pivotally mounted to pivot 30 is a second lever 32 resiliently connected through spring means 33 to lever 29. Piston 34 slidably movable in the stationary air pressure cylinder 35 has an extension rod 34a adapted to contact lever 32 so that when air pressure is introduced into the cylinder to urge piston 34 to the right against the spring biasing means 36, levers 32 and 29 will pivot in the counterclockwise direction to effect engagement of pressure thumb 27 with the work piece 15b. The cylinders 25 and 35 are alternatively operable, as will be described in greater detail below, so that when pin 20 is retracted to release work piece 15a, the pressure thumb 27 will secure work piece 15b against the opposite wall of the guide chamber. The lower portion of the vertical guide chamber 18 is formed in an annealing chamber 18a.

As pin 20 is retracted due to actuation of the cylinder 25, holding pin 37 secured to a piston (not shown) slidably movable in air pressure cylinder 38 is inserted into the annealing chamber 18a through opening 39 in the wall thereof to support work piece 15a as it drops by gravity within the high frequency heating coil 40 positioned concentrically about the chamber. As in the embodiment of Fig. 1, the heating coil 40 heats the work piece quickly to a temperature which is optimum for shapeability.

After the work piece has been heated for the desired period of time by the high temperature heating coil 40, pin 37 is retracted and the work piece falls by gravity onto pin 41 associated with a piston slidably movable within cylinder 42, wherein the work piece is heated by the low temperature heating coil 43 to effect temperature equalization of the piece. As will be seen from the figure, cylinders 25 and 42 are connected to the source of air pressure 44 through electromagnetic valve 45 and cylinders 35 and 38 are connected to the source through electromagnetic valve 46. The valves 45 and 46 are alternately controlled by suitable electrical timing means not shown, so that pins 34a and 37 will be retracted when pins 20 and 41 are inserted and vice versa.

The advantage of the embodiment of Fig. 2 over the embodiment of Fig. 1 is that the apparatus may be readily adjusted for different lengths of work pieces by vertical adjustment of the pressure thumb 27 by the bolt means 28. The pneumatic control of the cylinder operation allows for an inexpensively manufactured, durable and maintenance-free apparatus. The unilaterally-actuated pneumatic cylinders are so designed as to operate instantaneously to move the piston rods to the right in Fig. 2 upon pressure actuation, but are controlled by a suitable dimensioned return spring and throttled air outlet to move to the left with a desired retarded movement upon decrease of the applied fluid pressure. This retarded return movement of the pistons insures that the work pieces will pass individually through the annealing chamber.

It should be mentioned that the lower heating coil (7 in Fig. 1 and 43 in Fig. 2) need not necessarily be a high frequency heating coil, but rather it is sufficient to provide an ordinary resistance heating winding fed directly by a standard 60 cycle supply current. This is possible since at this point the work piece requires only a retaining of heat in the work piece so that the temperature can be distributed evenly in the interior of the work piece. The heating effect of these coils consists in a heat accummulation for the prevention of heat dissipation. The use of a resistance heating winding instead of a second high-frequency winding results in a lower initial cost of the apparatus in that the high-frequency generator need only be desired to provide power for the high frequency coils (6 in Fig. 1 and 40 in Fig. 2).

While in accordance with the patent statutes we have illustrated and described the best embodiments of our invention known to us, it will be apparent to those skilled in the art that changes may be made in the form of the apparatus described without departing from the spirit of our invention as set forth in the appended claims.

We claim:

1. A method for heating a non-ferrous metal work piece having a mass of 100 grams or less preparatory to a hot-pressing shaping operation comprising the steps of first heating the work piece in a first heating stage by high-frequency heating means to the temperature of optimum shapeability for a period of from five to fifteen seconds, then immediately heating the work piece in a second heating stage by low-frequency heating means for a period of from fifteen to five second to achieve temperature equalization completely through the work piece, the combined heating period being 20 seconds or less, and then immediately hot-pressing the heated work piece to a desired shape.

2. Apparatus for heating non-ferrous metal work pieces having a mass of 100 grams or less prior to hot-pressing in a press, comprising a vertical supply channel for feeding the work pieces downwardly by gravity, charging means connected in the upper portion of said supply channel for depositing said workpieces one at a time into said channel, said charging means including a charger holding pin slidably movable transversely in said channel to support a first work piece thereon, a pressure thumb pivotally connected to said guide channel a spaced distance above said charger holding pin and adapted to removably extend into said channel to retain a second work piece therein above said first work piece, means for alternately moving said pressure thumb and said charger holding pin to retain said second work piece in the vertical channel by said pressure thumb when said first work piece falls by gravity into said channel upon retraction of said charger holding pin, a high-frequency heating coil coaxially connected to said channel beneath said charger and arranged to receive a work piece therefrom, a low-frequency heating coil coaxially connected to said channel beneath said high-frequency heating coil and arranged to receive a work piece therefrom, a first holding pin slidably movable transversely in said channel beneath said high-frequency heating coil, a second holding pin slidably movable transversely in said channel beneath said low-frequency heating coil, pneumatic means controlling the movement of said holding pins in accordance with the operation of said charging means to cause alternate insertion and retraction of said first and second holding pins so that said work pieces will pass successively from said charging means through said first and second heating coils, and guide means connected to the lower end of said channel for directing the work pieces from the second heating coil to the press.

3. Apparatus as defined in claim 2 and further including means for vertically adjusting said pressure thumb to vary the vertical spacing of said pressure thumb with respect to said charger holding pin.

4. Apparatus as defined in claim 2 wherein the pneumatic means for controlling the operation of said heating coil holding pins, the charger holding pin, and the pressure thumb includes pneumatic cylinders having unilaterally operable pressure pistons alternately operated by control valves.

5. Apparatus as defined in claim 4 wherein the return of the pistons in the pneumatic cylinders is effected with retardation by spring and throttling means in said pneumatic cylinders.

6. Apparatus as defined in claim 5 wherein the pneumatic cylinders associated with the heating coil holding pins, the charger holding pin and the pressure thumb are connected in pairs for controlling the successive passage of the work pieces through the heating coils.

References Cited in the file of this patent

UNITED STATES PATENTS

| | | |
|---|---|---|
| 1,646,498 | Seede | Oct. 25, 1927 |
| 2,329,188 | Denneen et al. | Sept. 14, 1943 |
| 2,493,785 | Strickland et al. | Jan. 10, 1950 |
| 2,590,546 | Kincaid et al. | Mar. 25, 1952 |
| 2,669,647 | Segsworth | Feb. 16, 1954 |

FOREIGN PATENTS

| | | |
|---|---|---|
| 1,006,546 | Germany | Apr. 18, 1957 |

OTHER REFERENCES

Siemens-Schuckertiwerke, German application, Serial No. 537,326 V1/18c, printed Nov. 10, 1955 (klasse 18c, Gruppe 11/20).